United States Patent [19]

Tani et al.

[11] Patent Number: 4,603,067
[45] Date of Patent: Jul. 29, 1986

[54] METHOD OF COVERING AN ABRASION OF A GLASS CONTAINER BY APPLYING A SPECIFIED COATING MATERIAL

[75] Inventors: Masato Tani, Warabi; Seiichiro Ichikawa, Kawaguchi; Takahide Chikano, Tokyo; Kazuo Kawata, Shizuoka; Ichiro Nakamura, Kawaguchi; Eizo Motohashi, Houya; Kenji Hikita, Sapporo, all of Japan

[73] Assignee: Sapporo Breweries Limited, Tokyo, Japan

[21] Appl. No.: 682,815

[22] Filed: Dec. 18, 1984

Related U.S. Application Data

[62] Division of Ser. No. 546,989, Oct. 31, 1983, abandoned.

[30] Foreign Application Priority Data

Nov. 16, 1982 [JP] Japan ............... 57-199793

[51] Int. Cl.$^4$ ............................................. B27N 5/02
[52] U.S. Cl. .................................. 428/35; 427/389.7; 428/440; 428/442; 106/271
[58] Field of Search ............... 106/271; 427/389.7; 428/440, 442, 35

[56] References Cited

U.S. PATENT DOCUMENTS

| | | | |
|---|---|---|---|
| 2,702,796 | 2/1955 | Fine | 524/317 |
| 2,789,099 | 4/1957 | Rife et al. | 524/781 |
| 3,997,693 | 12/1976 | Kircher | 428/35 |
| 4,200,561 | 4/1980 | Chang | 524/313 |
| 4,273,834 | 6/1981 | Yokokura et al. | 428/35 |

FOREIGN PATENT DOCUMENTS 56-23444 3/1981 Japan .
57-179053 11/1982 Japan .

OTHER PUBLICATIONS

Chemical Abstracts; Index Guide, vol. 76-85, Cumulative 1972-1976.

*Primary Examiner*—Paul R. Michl
*Assistant Examiner*—Alex H. Walker
*Attorney, Agent, or Firm*—Frishauf, Holtz, Goodman & Woodward

[57] ABSTRACT

A method of covering an abrasion of a glass container comprising coating said container with an aqueous dispersion of a coating material comprising the following components:
(A) liquid paraffin;
(B) at least one fatty acid ester selected from the group consisting of sorbitan fatty acid esters, polyoxyethylene sorbitan fatty acid esters, sucrose fatty acid esters, propylene glycol fatty acid esters, glycerin fatty acid esters, and higher alcohol fatty acid esters; and
(C) sodium polyacrylate, the amount of each of said components based on the amount by weight of said dispersion is as follows:
(A) liquid paraffin: 1 to 25 percent;
(B) fatty acid ester: in an amount up to 10 percent;
(C) sodium polyacrylate: in an amount up to 5 percent.

10 Claims, No Drawings

METHOD OF COVERING AN ABRASION OF A GLASS CONTAINER BY APPLYING A SPECIFIED COATING MATERIAL

This application is a division of application Ser. No. 546,989, filed Oct. 31, 1983, now abandoned.

FIELD OF THE INVENTION

The present invention relates to a coating material to be applied onto an abrasion of bottle.

BACKGROUND OF THE INVENTION

Glass bottles, are used as containers for beer, fruit juice, and so forth. Usually, after being used, they are recovered for reuse.

When bottles are recovered and used repeatedly, an abrasion is formed in the external surface, particularly the shoulder portion thereof at the time of bottling or in the course of transportation. This will deteriorate their appearance and reduce their goods value.

Hence, when such abrasions are formed in recovered bottles, it is necessary to cover the abrasive portion of the bottle by any suitable means. One means is to apply a coating material onto the abrasive portion of the bottle.

Various coating materials have heretofore been proposed to cover an abrasion of a bottle. Although conventional coating materials are superior in the effect of covering an abrasion, they have some disadvantages. One of the disadvantage is that the coating material has poor drying properties because of its high hygroscopicity, and thus it becomes sticky and is liable to catch dust. Another disadvantage is that since the coating material adheres strongly to the bottles, it cannot be completely removed even after passing the bottles through the bottle-washing step. Furthermore, some of the coating materials as heretofore proposed are not suitable for practical use of their high price, or are not desirable from a hygienic standpoint or from a viewpoint of safety.

Hence it is required for a coating material to be applied onto an abrasive portion of bottle to meet the following requirements: (1) the effect of covering an abrasive portion is good, (2) emulsion stability is good and coating workability is superior, (3) drying properties are good, and it does not become sticky, (4) water resistance is superior, (5) it can be completely removed at the bottle-washing step, (6) it is not harmful from a viewpoint of food sanitation, and (7) it is inexpensive and is available stably.

The present invention is intended to provide a coating material satisfying all the requirements as described above.

SUMMARY OF THE INVENTION

The present invention relates to a coating material to be applied onto an abrasion of bottle, containing:
(A) liquid paraffin;
(B) at least one fatty acid ester selected from the group consisting of sorbitan fatty acid ester, polyoxyethylene sorbitan fatty acid ester, sucrose fatty acid ester, propylene glycol fatty acid ester, glycerin fatty acid ester, and higher alcohol fatty acid ester; and
(C) sodium polyacrylate.

In addition, the present invention relates to a coating material to be applied onto an abrasion of bottle, containing Components (A), (B) and (C) as described above and further
(D) morpholine fatty acid salt; and/or
(E) ethyl alcohol or propylene glycol.

DETAILED DESCRIPTION OF THE INVENTION

The coating material of the invention is used as an aqueous dispersion. Hence Components (A) to (E) of the present coating material will hereinafter be described in detail.

Component (A) is liquid paraffin, which is a base material to cover an abrasion of bottle and constitutes from 3 to 99.8% of the composition (which is used herein to mean the total amount of Components (A) to (E) as described above, excluding water). This liquid paraffin is authorized as a food additive. If desired, part (about 2 to 10%) of the liquid paraffin may be replaced by carnauba wax.

Component (B) is a fatty acid ester or esters. These esters, excluding higher alcohol fatty acid esters, are now authorized as emulsifying agents to be added to foodstuffs. Component (B) acts to enhance the force of the diffusion of the liquid paraffin on the surface of the bottle and penetrating through an abrasion thereof, and further to increase emulsion stability when the coating material of the invention is mixed with water. Sorbitan fatty acid ester, polyoxyethylene sorbitan fatty acid ester, sucrose fatty acid ester, propylene glycol fatty acid ester, glycerin fatty acid ester, and higher alcohol fatty acid ester can be used alone or in combination with each other. The amount of Component (B) being used ranges between 0.1 and 92% of the composition.

As the fatty acid for sorbitan fatty acid ester, or polyoxyethylene sorbitan fatty acid ester, for example, lauric acid, palmitic acid, stearic acid, oleic acid, linoleic acid, and linolenic acid are usually used. Of these compounds, water-easily soluble compounds such as sorbitan monolaurate, sorbitan monooleate, sorbitan trioleate, polyoxyethylene sorbitan monooleate, etc. are preferred.

For the sucrose fatty acid ester, a wide variety of fatty acids can be used. In the case of saturated fatty acid, the number of carbon atoms is from about 10 to 18; usually, for example, lauric acid, myristic acid, palmitic acid, and stearic acid are used. In the case of unsaturated fatty acids, the number of carbon atoms is from about 17 to 21; usually, for example, oleic acid, linoleic acid, and linolenic acid are used. Although these sucrose fatty acid esters are suitable since they are easily soluble in water and alcohol, and have good emulsifying properties, di- or more esters are inferior in dispersibility.

As the propylene glycol fatty acid ester, those compounds are usually used in which the fatty acid is lauric acid, palmitic acid, stearic acid, oleic acid, linoleic acid or linolenic acid, or a composite composition, such as coconut oil. Suitable examples are propylene glycol monolaurate, propylene glycol monostearate, and propylene glycol monococoate.

As the glycerin fatty acid ester, those compounds are used which are derived from fatty acids containing from 10 to 21 carbon atoms, preferably lauric acid, palmitic acid, stearic acid, oleic acid, linoleic acid, and linolenic acid. Monoester is preferred.

As the higher alcohol fatty acid ester, those compounds derived from alcohols containing from 6 to 20 carbon atoms, such as decyl alcohol, lauryl alcohol, and myristyl alcohol, and fatty acids containing from 10 to 21 carbon atoms, such as lauric acid, palmitic acid, stearic acid, oleic acid, and linoleic acid are used. In case of two or more compounds are used in combination, examples of the preferable combination are (1) polyoxyethylene sorbitan monooleate, glycerin monooleate and propylene glycol monooleate, (2) polyoxyethylene sorbitan monooleate, glycerin monostearate and propylene glycol monococoate (3) sorbitan monopalmitate, glycerin monostearate, sorbitan trioleate and propylene glycol monostearate, (4) polyoxyethylene sorbitan monooleate, glycerin monostearate and lauryl stearate.

Component (C) is sodium polyacrylate, which is a kind of paste to be added to foodstuffs. When coated on bottle, it forms a film and covers the liquid paraffin to improve workability, feel, and water resistance. Component (C) is added in such an amount that it constitutes from 0.001 to 83% of the composition.

In another embodiment of the present invention, the coating material contains Component (D) and/or Component (E), as well as Components (A), (B) and (C).

Component (D) is a morpholine fatty acid salt, which is a kind of coating agent to be added to foodstuffs and acts in nearly the same manner as Component (C). Component (D) is added in such an amount that it constitutes from 0 to 91% of the composition.

Component (E) is ethyl alcohol or propylene glycol, which acts as a solvent. This Component (E) is added in such an amount that it constitutes from 0 to 91% of the composition.

As described above, the coating material of the invention containing the components as described above is used as an aqueous dispersion. In the preparation of the aqueous dispersion, the concentration of each component is controlled as follows:

Component (A): from 1 to 25% and preferably from 3 to 15%;
Component (B): 10% or less and preferably from 0.05 to 3%;
Component (C): 5% or less and preferably from 0.001 to 2%;
Component (D): 10% or less and preferably from 0 to 5%; and
Component (E): 10% or less and preferably from 0 to 5%.

The coating material of the invention can be coated on bottle by various techniques, such as a coating method using a spraying apparatus and a coating method using cloth, felt, sponge or the like.

Since the coating material of the present invention contains the specific emulsifying agent, when it is mixed with water in use, the liquid paraffin as a base material can be emulsified very satisfactorily, and hence the final aqueous dispersion can be applied in a stabilized state over a long period of time. Furthermore, since sodium polyacrylate is added, the water resistance and the touch of the coating material are greatly improved. Another feature of the coating material of the invention is that it has good drying properties; that is, it does not become sticky. This is remarkable particularly when Component (D) or carnauba wax is used.

The covering effect of the coating material of the invention does not change when bottle whose abrasion is covered with it is stored at ordinary temperature for one month. Even when the bottle is stored in, for example, a refrigerator or a water-cooled showcase, the covering effect does not drop and a label put on the bottle is free from wetting. Further, when the bottle is used and recovered for reuse, the coating material can be completely washed out at the bottle-washing step.

Almost of the ingredients for use in the coating material of the present invention are authorized as food additives, and hence the coating material of the present invention does not cause any problem in respect of safety. Furthermore the ingredients are inexpensive and can be supplied stably.

The present invention is described in detail with reference to the following Examples.

EXAMPLE 1

| Ingredient | % |
|---|---|
| Liquid paraffin (trade name: Ramol Oil, produced by Koritsu Kagaku Co., Ltd.) | 12 |
| Polyoxyethylene sorbitan monooleate (trade name: Tween 80, produced by Kao Atlus Co., Ltd.) | 0.6 |
| Sorbitan monooleate (trade name: SPAN 80, produced by Kao Atlus Co., Ltd.) | 0.2 |
| Sodium polyacrylate (trade name: Aronbis, produced by Nippon Junyaku Co., Ltd.) | 0.5 |

These ingredients were compounded with water so that the proportion of each component was as described above and stirred at 7,000 revolutions per minute (rpm) for 5 minutes by the use of Homomixer Model SL (produced by Tokushu Kika Kogyo Co., Ltd.) to prepare 2 liters of a uniformly dispersed coating material.

Three minutes after the preparation, the coating material was coated on an abrasive portion of a beer bottle by applying absorbent cotton soaked therein. This coating material had good emulsifying properties and showed superior workability.

The coating material was estimated collectively by: drying properties as determined with hand; the abrasion-covering effect as determined with naked eye; water resistance as determined by dipping the coated bottle into water; appearance and touch of the bottle after coating; and safety. The result is shown in Table 1.

EXAMPLE 2

An aqueous dispersion containing 3% of liquid paraffin (trade name: Ramol Oil, produced by Koritsu Kagaku Co., Ltd.), 1.5% of glycerin fatty acid ester (trade name: Highglycera, produced by Tanabe Seiyaku Co., Ltd.), and 0.1% of sodium polyacrylate (trade name: Aronbis, produced by Nippon Junyaku Co., Ltd.).

The aqueous dispersion thus prepared was applied and estimated in the same manner as in Example 1. The result is shown in Table 1.

EXAMPLE 3

An aqueous dispersion containing 25% of liquid paraffin (the same as used in Example 1), 0.5% of sorbitan trioleate (trade name: SPAN 85, produced by Kao Atlus Co., Ltd.), 3% of glycerin fatty acid ester (trade name: Monolight L, produced by Miyoshi Yushi Co., Ltd.), and 1% of sodium polyacrylate (the same as used in Example 1) was prepared.

The aqueous dispersion was applied and estimated in the same manner as in Example 1. The result is shown in Table 1.

EXAMPLE 4

An aqueous dispersion containing 8% of liquid paraffin (the same as used in Example 1), 0.5% of glycerin fatty acid ester (trade name: Sungly, produced by Taiyo Yushi Co., Ltd.), 0.2% of sucrose fatty acid ester (trade name: Ryoto Sugar Ester, produced by Ryoto Co., Ltd.), 0.3% of propylene glycol fatty acid ester (trade name: Protex, produced by Nippon Kasseizai Co., Ltd.), and 0.05% of sodium polyacrylate (the same as used in Example 1) was prepared.

The aqueous dispersion was applied and estimated in the same manner as in Example 1. The result is shown in Table 1.

EXAMPLE 5

An aqueous dispersion containing 7% of liquid paraffin (the same as used in Example 1), 0.3% of polyoxyethylene sorbitan monooleate (trade name: Tween 80, produced by Kao Atlus Co., Ltd.), 0.1% of glycerin monooleate (trade name: Aldo 40, produced by Glyco Product Ltd.), 0.2% of propylene glycol monooleate (trade name: G-923, produced by Atlas Powder Co., Ltd.), and 0.02% of sodium polyacrylate (the same as used in Example 1) was prepared.

The aqueous dispersion was applied and estimated in the same manner as in Example 1. The result is shown in Table 1.

EXAMPLE 6

An aqueous dispersion containing 10% of liquid paraffin (the same as used in Example 1), 1.2% of sorbitan fatty acid ester (trade name: Adekanate B-3009A, produced by Asahi Denka Co., Ltd.), 0.015% of sodium polyacrylate (the same as used in Example 1), and 4% of morpholine fatty acid salt produced by Takamatsu Yushi Co., Ltd.) was prepared.

The aqueous dispersion was applied and estimated in the same manner as in Example 1. The result is shown in Table 1.

EXAMPLE 7

An aqueous dispersion containing 20% of liquid paraffin (the same as used in Example 1), 5% of polyoxyethylene sorbitan monolaurate (trade name: Tween 20, produced by Kao Atlas Co., Ltd.), 5% of sodium polyacrylate (the same as used in Example 1), 8% of morpholine fatty acid salt (produced by Takamatsu Yushi Co., Ltd.), and 10% of ethyl alcohol was prepared.

This aqueous dispersion was applied and estimated in the same manner as in Example 1. The result is shown in Table 1.

EXAMPLE 8

An aqueous dispersion containing 5% of liquid paraffin (the same as used in Example 1), 10% of propylene glycol fatty acid ester (trade name: Rikemal, produced by Riken Vitamin Oil Co., Ltd.), 2% of sodium polyacrylate (the same as used in Example 1), and 5% of propylene glycol (produced by Asahi Denka Co., Ltd.) was prepared.

This aqueous dispersion was applied and estimated in the same manner as in Example 1. The result is shown in Table 1.

EXAMPLE 9

An aqueous dispersion containing 1% of liquid paraffin (the same as used in Example 1), 0.05% of sorbitan monolaurate (trade name: SPAN 20, produced by Kao Atlas Co., Ltd.), 0.6% of glycerin monostearate (trade name: Aldo 28, produced by Glyco Product Ltd.), 0.1% of sucrose fatty acid ester (trade name: DK Ester, produced by Daiichi Kogyo Seiyaku Co., Ltd.), 0.01% of propylene glycol monostearate (trade name: Hodag PGS, produced by Hoda Chemical Corp.), 0.001% of sodium polyacrylate (the same as used in Example 1), 0.1% of morpholine fatty acid salt (produced by Takamatsu Yushi Co., Ltd.), and 1% of propylene glycol (produced by Asahi Denka Co., Ltd.) was prepared.

This aqueous dispersion was applied and estimated in the same manner as in Example 1. The result is shown in Table 1.

EXAMPLE 10

An aqueous dispersion containing 6.5% of liquid paraffin (the same as used in Example 1), 0.2% of polyoxyethylene sorbitan monooleate (trade name: Tween 80, produced by Kao Atlas Co., Ltd.), 0.2% of glycerin fatty acid ester (trade name: Monoglyceride SA UENO, produced by Ueno Seiyaku Co., Ltd.), 0.2% of propylene glycol monococoate (trade name: Hodag PGL, produced by Hoda Chemical Corp.), 0.01% of sodium polyacrylate (the same as used in Example 1), and 0.2% of morpholine fatty acid salt (produced by Takamatsu Yushi Co., Ltd.) was prepared.

This aqueous dispersion was applied and estimated in the same manner as in Example 1. The result is shown in Table 1.

EXAMPLE 11

An aqueous dispersion containing 8% of liquid paraffin (the same as used in Example 1), 0.4% of carnauba wax (trade name: Carnauba Wax TS-3, produced by Takamatsu Yushi Co., Ltd.), 0.7% of polyoxyethylene sorbitan monooleate (trade name: Tween 80, produced by Kao Atlas Co., Ltd.), 0.015% of sodium polyacrylate (the same as used in Example 1), and 0.15% of morpholine fatty acid salt (produced by Takamatsu Yushi Co., Ltd.) was prepared.

This aqueous dispersion was applied and estimated in the same manner as in Example 1. The result is shown in Table 1.

EXAMPLE 12

An aqueous dispersion containing 7% of liquid paraffin (the same as used in Example 1), 0.3% of polyoxyethylene sorbitan monooleate (trade name: Tween 80, produced Kao Atlas Co., Ltd.), 0.1% of glycerin fatty acid ester (trade name: Aldo 40, produced by Glyco Product Ltd.), 0.2% of lauryl stearate (produced by Tokyo Kasei Co., Ltd.), and 0.015% of sodium polyacrylate (the same as used in Example 1) was prepared.

This aqueous dispersion was applied and estimated in the same manner as in Example 1. The result is shown in Table 1.

TABLE 1

| Example | Emulsifying Property | Drying Property | Abrasion-covering Effect | Water Resistance | Workability | General Estimation |
|---|---|---|---|---|---|---|
| 1 | C | C | B | A | B | B |
| 2 | B | C | B | B | B | B |
| 3 | C | C | B | C | C | C |
| 4 | B | C | B | B | A | B |
| 5 | A | B | A | A | A | A |
| 6 | B | A | B | B | A | B |
| 7 | C | C | B | B | C | C |
| 8 | B | C | C | B | C | C |
| 9 | C | A | C | C | A | C |
| 10 | A | A | A | A | A | A |
| 11 | A | A | A | A | A | A |
| 12 | A | B | A | A | A | A |

A: Excellent
B: Good
C: Enough to use

What is claimed is:

1. A method of covering an abrasion of a glass container comprising coating said container with an aqueous dispersion of a coating material comprising the following components:
   (A) liquid paraffin;
   (B) at least one fatty acid ester selected from the group consisting of sorbitan fatty acid esters, polyoxyethylene sorbitan fatty acid esters, sucrose fatty acid esters, propylene glycol fatty acid esters, glycerin fatty acid esters, and higher alcohol fatty acid esters; and
   (C) sodium polyacrylate: 0.001 to 5 percent.
the amount of each of said components based on the amount by weight of said dispersion is as follows:
   (A) liquid paraffin: 1 to 25 percent;
   (B) fatty acid ester: in an amount up to 10 percent;
   (C) sodium polyacrylate: 0.001 to 5 percent.

2. The method of claim 1, wherein said fatty acid ester is one selected from the group consisting of (1) polyoxyethylene sorbitan monooleate, (2) polyoxyethylene sorbitan monooleate glycerin monooleate, and propylene glycol monooleate, (3) polyoxyethylene sorbitan monoleate, glycerin monostearate, and propylene glycol monococoate, (4) sorbitan monopalmitate, glycerin monostearate, sorbitan trioleate, and propylene glycol monostearate, and (5) polyoxyethylene sorbitan monooleate, glycerin monostearate and lauryl stearate.

3. The method of claim 1, wherein the amount of each of said components based on the amount of said aqueous dispersion is as follows:
   (A) liquid paraffin: 3 to 15 percent;
   (B) fatty acid ester: 0.05 to 3 percent;
   (c) sodium polyacrylate: 0.001 to 2 percent.

4. The method of claim 1, wherein said coating material further comprises a component selected from the group consisting of morpholine fatty acid salt, morpholine fatty acid salt and ethyl alcohol, morpholine fatty acid salt and propylene glycol, ethyl alcohol and propylene glycol.

5. The method of claim 4, wherein said fatty acid ester is selected from the group consisting of (1) polyoxyethylene sorbitan monooleate, (2) polyoxyethylene sorbitan monooleate, glycerin monooleate, and propylene glycol monooleate, (3) polyoxyethylene sorbitan monoleate, glycerin monostearate, and propylene glycol monococoate, (4) sorbitan monopalmitate, glycerin monostearate, sorbitan trioleate, and propylene glycol monostearate, and (5) polyoxyethylene sorbitan monooleate, glycerin monostearate and lauryl stearate.

6. The method of claim 4, wherein said coating material comprises:
   (A) liquid paraffin: 1 to 25 percent;
   (B) fatty acid ester: up to 10 percent;
   (C) sodium polyacrylate: 0.001 to 5 percent;
   (D) morpholine fatty acid salt: 0 to 10 percent; and
   (E) ethyl alcohol or propylene glycol: 0 to 10 percent.

7. The method of claim 4, wherein said coating material comprises:
   (A) liquid paraffin: 3 to 15 percent;
   (B) fatty acid ester: 0.05 to 3 percent;
   (C) sodium polyacrylate: 0.001 to 2 percent;
   (D) morpholine fatty acid salt: 0 to 5 percent; and
   (E) ethyl alcohol or propylene glycol: 0 to 5 percent.

8. The method of claim 2, wherein the amount of each of said components based on the amount of said aqueous dispersion is as follows:
   (A) liquid paraffin: 3 to 15 percent;
   (B) fatty acid ester: 0.05 to 3 percent;
   (C) sodium polyacrylate: 0.001 to 2 percent.

9. The method of claim 8, wherein said coating material further comprises a component selected from the group consisting of morpholine fatty acid salt, morpholine fatty acid salt and ethyl alcohol, morpholine fatty acid salt and propylene glycol, ethyl alcohol and propylene glycol.

10. The method of claim 3, wherein said coating material further comprises a component selected from the group consisting of morpholine fatty acid salt, morpholine fatty acid salt and ethyl alcohol, morpholine fatty acid salt and propylene glycol, ethyl alcohol and propylene glycol.

* * * * *

UNITED STATES PATENT AND TRADEMARK OFFICE
CERTIFICATE OF CORRECTION

PATENT NO. : 4,603,067

DATED : July 29, 1986

INVENTOR(S) : Masato TANI et al.

It is certified that error appears in the above-identified patent and that said Letters Patent is hereby corrected as shown below:

Column 7 (Claim 1), line 31, after "sodium polyacrylate"

delete ": 0.001 to 5 percent." and insert --,--.

Signed and Sealed this

Sixteenth Day of December, 1986

Attest:

DONALD J. QUIGG

Attesting Officer    Commissioner of Patents and Trademarks